US009716692B2

(12) United States Patent
Cismas et al.

(10) Patent No.: US 9,716,692 B2
(45) Date of Patent: Jul. 25, 2017

(54) TECHNOLOGY-AGNOSTIC APPLICATION FOR HIGH CONFIDENCE EXCHANGE OF DATA BETWEEN AN ENTERPRISE AND THIRD PARTIES

(71) Applicant: BANK OF AMERICA CORPORATION, Charlotte, NC (US)

(72) Inventors: Sorin N. Cismas, Addison, TX (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 55 days.

(21) Appl. No.: 14/588,425

(22) Filed: Jan. 1, 2015

(65) Prior Publication Data
US 2016/0197885 A1 Jul. 7, 2016

(51) Int. Cl.
*H04L 29/06* (2006.01)
*H04L 29/08* (2006.01)
*G06F 21/60* (2013.01)

(52) U.S. Cl.
CPC ............ *H04L 63/04* (2013.01); *G06F 21/606* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 6,219,718 B1 * | 4/2001 | Villalpando | H04L 41/0816 709/230 |
| 6,380,967 B1 * | 4/2002 | Sacca | H04N 7/141 348/14.01 |
| 6,642,943 B1 * | 11/2003 | Machida | H04N 1/00408 358/1.15 |
| 8,104,077 B1 * | 1/2012 | Gauvin | H04L 65/1079 726/12 |
| 8,768,838 B1 * | 7/2014 | Hoffman | G06Q 40/00 705/44 |
| 9,628,509 B2 * | 4/2017 | Holloway | H04L 63/1458 |

(Continued)

OTHER PUBLICATIONS

Cadman (Neil Cadman, How to copy files in C# with a customizable progress indicator and or progress bar, 5/09 found at http://www.codeproject.com/Articles/36647/How-to-copy-files-in-C-with-a-customizable-progres).*

*Primary Examiner* — Peter Poltorak
(74) *Attorney, Agent, or Firm* — Michael A. Springs; Moore & Van Allen PLLC; James C. Edwards

(57) ABSTRACT

A technology-agnostic and protocol-agnostic system for transferring data between an enterprise, such as a financial institution or the like and external entities, such as commercial banking customers and the like. The embodiments described provide the user with a data transfer solution that is compatible with all major operating systems, supports mobile platforms and allows for local data transfer, as well as, data transfer from cloud services and cloud connection services. The comprehensive nature of the application provides for applicable data transfer amongst all of the different services provided by the enterprise and provides the user/external entity with a streamlined means for transferring data to and from the enterprise. The application minimizes external entity involvement from an Information Technology (IT) standpoint, such that any user can efficiently, effectively and reliably transfer data to and from an enterprise with minimal risk and high confidence.

16 Claims, 3 Drawing Sheets

(56) References Cited

U.S. PATENT DOCUMENTS

| | | | |
|---|---|---|---|
| 2001/0016914 A1* | 8/2001 | Tabata | H04L 63/0272 726/15 |
| 2002/0013908 A1* | 1/2002 | Nishihata | G06F 21/6218 726/25 |
| 2002/0194501 A1* | 12/2002 | Wenocur | G06Q 10/107 726/4 |
| 2003/0093315 A1* | 5/2003 | Sato | G06Q 10/107 705/14.14 |
| 2003/0093554 A1* | 5/2003 | Wolfe | G06Q 20/203 709/238 |
| 2003/0105979 A1* | 6/2003 | Itoh | H04L 12/5855 726/24 |
| 2003/0171145 A1* | 9/2003 | Rowe | G06Q 20/02 463/25 |
| 2003/0177221 A1* | 9/2003 | Ould-Brahim | H04L 12/4641 709/223 |
| 2005/0080801 A1* | 4/2005 | Kothandaraman | H04L 67/06 |
| 2005/0097320 A1* | 5/2005 | Golan | G06F 21/40 713/166 |
| 2005/0177271 A1* | 8/2005 | Koren | B64F 1/368 700/213 |
| 2005/0188220 A1* | 8/2005 | Nilsson | H04L 63/04 726/5 |
| 2006/0031918 A1* | 2/2006 | Sarachik | H04N 7/17309 725/138 |
| 2006/0059253 A1* | 3/2006 | Goodman | G06Q 10/10 709/223 |
| 2006/0248036 A1* | 11/2006 | Stanev | G06F 9/4435 |
| 2007/0053508 A1* | 3/2007 | Yasumoto | H04L 63/105 380/28 |
| 2007/0094711 A1* | 4/2007 | Corley | G06F 21/53 726/3 |
| 2008/0021830 A1* | 1/2008 | Apergis | G06Q 20/042 705/45 |
| 2008/0034197 A1* | 2/2008 | Engel | H04L 63/0428 713/150 |
| 2008/0065648 A1* | 3/2008 | Gupta | G06F 17/30575 |
| 2008/0249936 A1* | 10/2008 | Miller | G06Q 20/102 705/40 |
| 2008/0313726 A1* | 12/2008 | Gardner | H04L 9/3273 726/9 |
| 2009/0094670 A1* | 4/2009 | Park | G06F 21/577 726/1 |
| 2009/0118845 A1* | 5/2009 | Eldridge | G05B 15/02 700/86 |
| 2009/0187962 A1* | 7/2009 | Brenneman | G06F 21/316 726/1 |
| 2010/0210240 A1* | 8/2010 | Mahaffey | H04L 41/0253 455/411 |
| 2011/0016214 A1* | 1/2011 | Jackson | G06F 9/5044 709/226 |
| 2011/0106877 A1* | 5/2011 | Hsieh | H04L 67/06 709/203 |
| 2011/0235991 A1* | 9/2011 | Luthra | H04N 21/4126 386/232 |
| 2013/0166311 A1* | 6/2013 | Stock | G06F 8/63 705/2 |
| 2013/0318345 A1* | 11/2013 | Hengeveld | H04L 12/4633 713/168 |
| 2013/0325943 A1* | 12/2013 | Al-Harthi | G06Q 50/01 709/204 |
| 2015/0317128 A1* | 11/2015 | Baughman | G06F 17/30294 717/103 |
| 2016/0012465 A1* | 1/2016 | Sharp | G06Q 20/18 705/14.17 |

* cited by examiner

TECHNOLOGY-AGNOSTIC APPLICATION FOR HIGH CONFIDENCE EXCHANGE OF DATA BETWEEN AN ENTERPRISE AND THIRD PARTIES

FIELD

In general, embodiments of the invention relate to network data communication and, more particularly, a technology-agnostic and protocol-agnostic means for securely transferring data between an enterprise, for example a financial institution, and third parties/external entities, such as commercial customers, consumer customers or vendors.

BACKGROUND

In large enterprise businesses, such as financial institutions or the like, it is imperative that the transfer of essential data occur in a highly secure environment. For example, commercial banking customers routinely communicate payment files and check image files to the financial institution on an ongoing basis and it is necessary to ensure that such data is transferred in a highly reliable and secure manner.

Currently, such transfer of payment files, check image files or the like requires the commercial customer to execute a transfer transaction using any of the various commercial file transfer applications in existence. These file transfer applications tend to be technology and/or protocol-specific or limited in terms of the technology and or protocols that may be implemented in order to ensure that the transfer of data occurs securely. In a large enterprise, such as a financial institution, which may provide numerous different services to a customer, each service may dictate a different means for transferring data based on the frequency and volume of data transferred, the security/risk associated with transferring the data and the like.

Further, in a large enterprise environment, the third parties (otherwise referred to herein as external entities) that transfer data to the enterprise will vary in terms of size and information technology sophistication. For example, in the financial institution environment, large commercial customers will generally have extensive information technology support, which is capable of setting-up, maintaining and properly executing all of the different file transfer applications required of the third-party. However, on the opposite end of the spectrum, small commercial customers, most noticeably micro commercial customers, will generally have very limited, if any, information technology support and, as such, face many obstacles in being able to set-up, properly execute and maintain different file transfer applications.

Therefore, a need exists to develop systems, apparatus, computer program products, methods and the like that provide for technology-agnostic and protocol-agnostic means for transferring data between an enterprise, such as a financial institution or the like and external entities, such as commercial banking customers and the like. The desired systems, apparatus, computer program products, methods and the like should provide the user with an off-the-shelf solution that is applicable to all of the different services provided by the enterprise and provides the user/external entity with a streamlined means for transferring data to and from the enterprise. In this regard, the systems, apparatus, computer program products, methods and the like should allow for the external entity to immediately transfer data upon inception of the relationship with the enterprise and/or upon acquisition of a new service provided by the enterprise. Moreover, the systems, apparatus, computer program products, methods and the like should minimize external entity involvement from an Information Technology (IT) standpoint, such that any user can efficiently, effectively and reliably transfer data to and from an enterprise with minimal risk and high confidence.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a technology-agnostic and protocol-agnostic application for transferring data between an enterprise and an external entities (i.e., third parties, such as customers/clients, vendors and the like). The application provides for service-specific modules that allow for secure connections to be established between enterprise and the external entity and for a simplified "click-and-send" approach to transferring files, thus eliminating the need for the external entity to configure transactions and secure communication channels on their own. The universal nature of the application means that the external entity can transfer files without having to set-up, execute and maintain a myriad of different file transfer applications, protocols and the like.

In addition, the application is configured to be associated with one or more user-specific identifiers, such as account numbers or the like, such that, the enterprise can easily identify who is transmitting the data and where the data needs to go (i.e., who is using the data and/or a storage location for the data). Moreover, the application provides for self-regulating and self-updating such that the application is compliant, in real-time, with enterprise regulations and the updated revisions to the application and/or modules can occur absent user/external entity intervention. Additionally, the application allows the user to track the progress of the data transfer and receive confirmation upon successful completion of a data file transfer.

An apparatus for transferring data between an enterprise and an external entity defines first embodiments of the invention. The apparatus includes a computing platform that is accessible to the external entity, is in communication with a memory and includes at least one processor in communication with the memory. The apparatus further includes a data transfer application that is stored in the memory and executable by the processor. The application includes one or more external-entity specific modules configured for protocol-agnostic and technology-agnostic transfer of data between the external entity and enterprise. Each of the one or more modules is specific to a service provided to the external entity by the enterprise and provides for the transfer of data via a secure connection between the external entity and the service. For example, in those embodiments in which the enterprise is a financial institution and the external entity is a commercial banking customer, the modules in the customer's application will coincide with the banking services (e.g., Automated Clearing House (ACH), Account Reconciliation Process (ARP), Lockbox and the like) provided to the client that require data transfer (e.g., transfer of payment files, check images and the like).

In addition the data transfer application provides a user-interface, such as Graphical User Interface (GUI) and/or command line or the like, that is configured to allow the external entity to select a module for (1) dynamic transferring of one or more data files from the external entity to the enterprise, or (2) pre-configuring scheduled transfers of one or more data files. In specific embodiments of the apparatus, the user-interface is further configured to allow the external entity to select a module for pre-configuring scheduled transfers of one or more data files, wherein pre-configured scheduled transfers may be configured to allow for data files to be automatically transferred upon creation of the data file or at predetermined times.

In specific embodiments of the apparatus, each of the one or more external-entity specific modules in the data transfer application are associated with one or more external entity identifiers (e.g., customer account numbers or the like) that automatically attach to data transfer to ensure that, upon receipt by the enterprise, the data is automatically routed to storage location associated with the external entity identifier.

In further specific embodiments of the apparatus, the data transfer application is self-updating to allow for the enterprise to, without external entity/user intervention, (1) implement updates/revisions to the application and/or one or more modules, (2) make changes to external entity data or services data associated with a module, and (3) provide new modules to the data transfer application in response to the external entity adding associated new services. In related embodiments of the apparatus, the data transfer application is self-regulating to allow for the enterprise to, without external entity intervention, ensure that the application is compliant with enterprise regulations (e.g., a financial institution maintaining compliance with financial services regulations and the like).

In still further specific embodiments of the apparatus, the data transfer application provides for the enterprise to self-manage a security level provided to each of the one or more modules. In this regard, self-managing of the security level provides for the enterprise to configure and dynamically change, without external entity intervention, the security level based on one or more of (1) risk associated with data being transferred or (2) current data transfer vulnerabilities identified by the enterprise.

In other embodiments of the apparatus, the data transfer application provides for another user-interface that is configured to allow the user/external entity to track the status of the data (e.g., location of the data within the network of the enterprise).

Moreover, in other specific embodiments of the apparatus, the one or more external-entity specific modules are further configured to provide for the transfer of data via a secure connection between the external entity and a middleware component of the service (e.g., a routing hub or the like).

In still further specific embodiments of the apparatus, the data transfer application is further configured to provide for temporary secure connection channels and temporary connection profiles that allow for one-time transfer of data between the enterprise and external entity and are removed from the memory or disabled upon completion of the one-time transfer.

In further specific embodiments of the apparatus, the data transfer application provides for throttled transfer of data, such that, a data file is automatically segmented and communicated in individual segments to address bandwidth concerns, ensure that large files are transferred and allow for only the segments that have yet to be received to be resent in the event of a communication failure.

Lastly, in additional specific embodiments of the apparatus, the data transfer application is configured to recognize a geographic location from which a data file is transferred and comply with encryption rules associated with the geographic location.

A system for transferring data between an enterprise and external entity defines second embodiments of the invention. The system includes a computing device accessible to the external entity, in communication with a first memory and including at least one first processor. The system additionally includes a data transfer application that is stored in the first memory and executable by the first processor. The application includes one or more external-entity specific modules configured for protocol-agnostic and technology-agnostic transfer of data between the external entity and enterprise. Each of the one or more modules is specific to a service provided to the external entity by the enterprise and provide for the transfer of data via a secure connection between the external entity and the service.

In addition, the system includes a hub computing device under control of the enterprise, in communication with a second memory and including at least one second processor. Additionally, the system includes a data routing application that is stored in the second memory and executable by the second processor. The data routing application is configured for receiving data transfers via the secure connections and determining enterprise routing for the data based on the module and an external entity identifier associated with the secure connection.

An apparatus for transferring data between a financial institution and third-party associated with the financial institution defines third embodiments of the invention. The apparatus includes a computing platform under control of and accessible to the third-party that is in communication with a memory and includes at least one processor in communication with the memory. The apparatus further includes a data transfer application that is stored in the memory and executable by the processor. The data transfer application includes one or more third-party specific modules configured for protocol-agnostic and technology-agnostic transfer of data between the external entity and enterprise. Each of the one or more modules is specific to a service provided to the third-party by the financial institution and provides for the transfer of data via a secure connection between the external entity and the service. Further, each of the one or more modules are associated with one or more external entity identifiers that automatically attach to the transfer of data to ensure that, upon receipt by the financial institution, the data is automatically routed to a storage location(s) associated with the external entity identifier and the service associated with the module. In addition, the data transfer application includes a user-interface configured to allow the third-party to select a module for (1) dynamic transferring of one or more data files from the external entity to the enterprise, or (2) pre-configuring scheduled transfers of one or more data files.

Thus, systems, apparatus, methods, and computer program products herein described in detail below provide for a technology-agnostic and protocol-agnostic means for transferring data between an enterprise, such as a financial institution or the like and external entities, such as commercial banking customers and the like. The embodiments provide the user with a data transfer solution that is compatible with all major operating systems, supports mobile platforms and allows for local data transfer, as well as, data transfer from cloud services and cloud connection services. Moreover, the comprehensive nature of the application provides for applicable data transfer amongst all of the different services provided by the enterprise and provides the user/external entity with a streamlined means for transferring data to and from the enterprise. In this regard, embodiments of the invention allow for the external entity to immediately transfer data upon inception of the relationship with the enterprise and/or upon acquisition of a new service provided by the enterprise without having to establish a secure connection that is specific to the service or an application. Moreover, the application minimizes external entity involvement from an Information Technology (IT) standpoint, such that any user can efficiently, effectively and reliably transfer data to and from an enterprise with minimal risk and high confidence.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
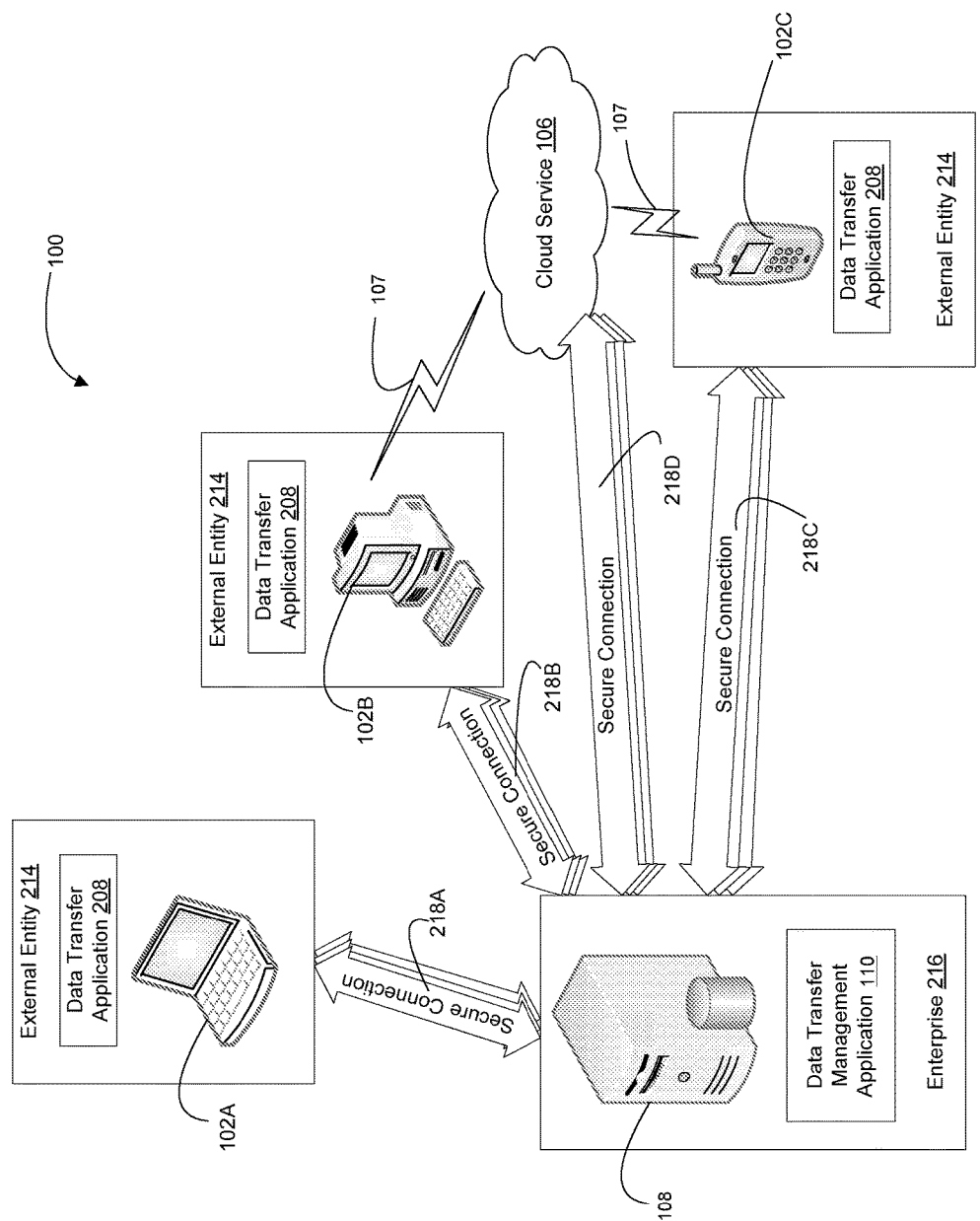
Figure 2:
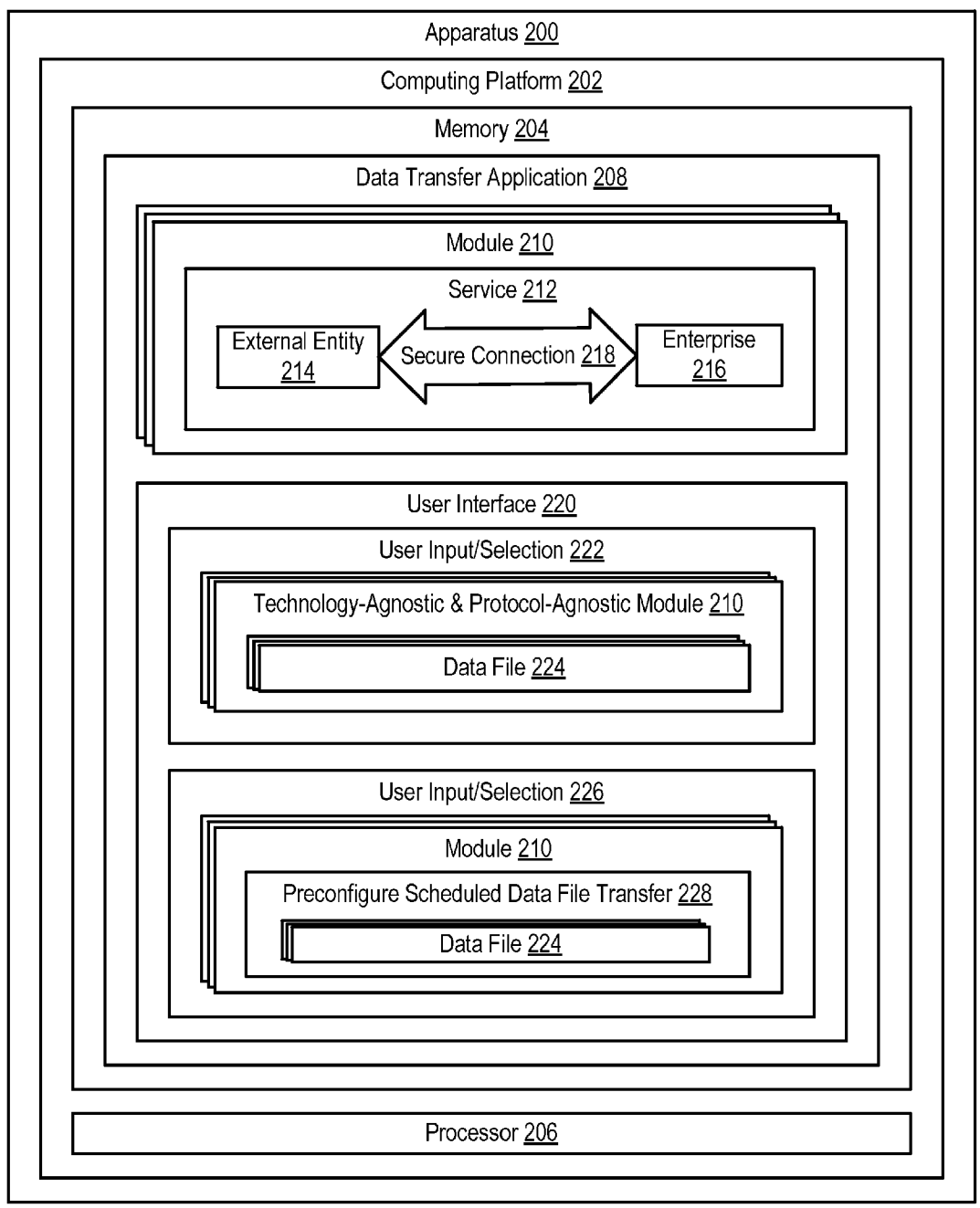
Figure 3:
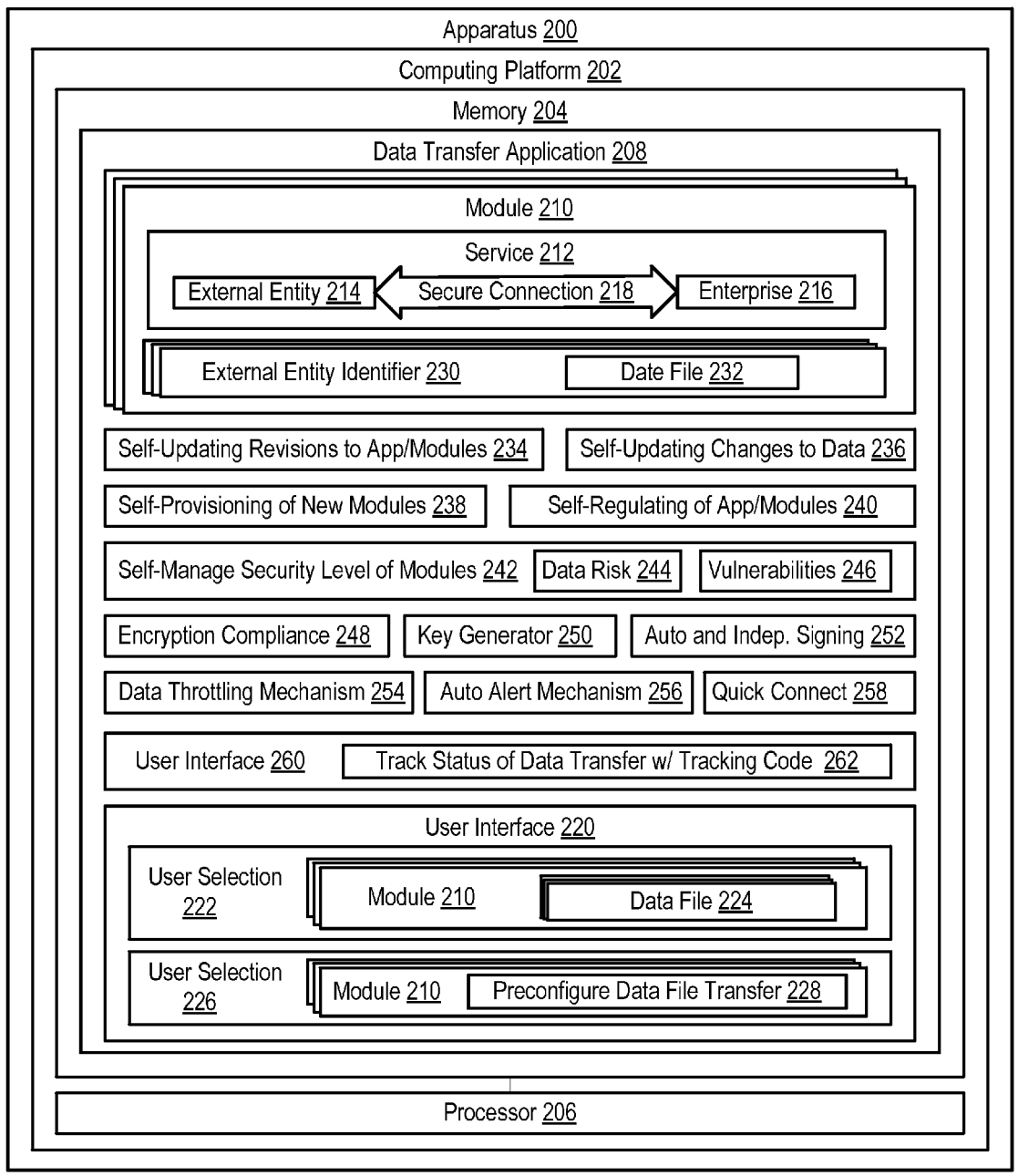

Having thus described embodiments of the invention in general terms, reference will now be made to the accompanying drawings, which are not necessarily drawn to scale, and wherein:

FIG. 1 provides a schematic diagram of a system for data transfer between an enterprise and an external entity, in accordance with embodiments of the present invention;

FIG. 2 provides a block diagram of an apparatus configured for transferring data between an enterprise and an external entity, in accordance with embodiments of the present invention; and FIG. 3 provides a more detailed block diagram of the apparatus configured for transferring data between an enterprise and an external entity, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a technology-agnostic and protocol-agnostic application for transferring data between an enterprise and an external entities (i.e., third parties, such as customers/clients, vendors and the like). The application provides for service-specific modules that allow for secure connections to be established between enterprise and the external entity and for a simplified "click-and-send" approach to transferring files, thus eliminating the need for the external entity to configure transactions and secure communication channels on their own. The universal nature of the application means that the external entity can transfer files without having to set-up, execute and maintain a myriad of different file transfer application, protocols and the like.

In addition, the application is configured to be associated with one or more user-specific identifiers, such as account numbers or the like, such that, the enterprise can easily identify who is transmitting the data and where the data needs to go (i.e., who is using the data and/or a storage location for the data). Moreover, the application provides for self-regulating and self-updating such that the application is compliant, in real-time, with enterprise regulations and the updated revisions to the application and/or modules can occur absent user/external entity intervention. Additionally, the application allows the user to track the progress of the data transfer and receive confirmation upon successful completion of a data file transfer.

Referring to FIG. 1, a schematic diagram is provided of a system 100 for technology-agnostic and protocol-agnostic data transmission between an enterprise 216 and external entities 214, in accordance with embodiments of the present invention. Each of the external entities 214 (e.g., third parties, such as customers, vendors or the like) are provided, by the enterprise 216, a data transfer application 208. For example, in those embodiments in which the enterprise 216 is a financial institution, a new customer, during the onboarding process, may be provided a tangible product (e.g., flash drive, CD or the like) that stores the application 208 or provided an electronic communication that has an activatable link for downloading the application. The external entity 214 may store the application 208 locally on a personal computing device, laptop, server, web-based or the like or store the application externally in cloud storage or the like. FIG. 1 illustrates that, in accordance with embodiments of the invention, the data transfer application 208 may be accessed, by an external entity user, from any computing device that has access to the storage location of the application. For example, a laptop computing device 102A, a personal computing (PC) device 102B, a mobile communication device 102C (e.g., smart phone or the like) may locally store the application or may have network access to the external entity's storage location. It should be noted that while FIG. 1 illustrates each external entity implementing one computing device type, in practice, each external entity may access and/or store locally the data transfer application 208 on multiple different computing devices and computing device types. In this regard the data transfer application 208 is configured to be supported by multiple different operating systems, such as Windows®. OSX®, Linux/open source or the like, as well as mobile operating systems, such as IOS®, Android® and the like.

The data transfer application 208 is configured by the enterprise to include modules that are specific to services provided by the enterprise to the external entity. For example, in those embodiments in which the enterprise is a financial institution and the external entity is commercial banking customer, the customer may initially, at onboarding, agree to services, such as Account Reconciliation Process (ARP), Automated Clearing House (ACH), and the like and the data transfer application 208 is specifically configured for the customer to include modules associated with each of the services or modules associates with more than one of the services (i.e., a line-of-business module that may include both ARP and ACH services). During the lifecycle of the customer, as the customer adds or removes services, the enterprise can push (or pull/remove) modules to/from the customer's data transfer application 208 or update/revise modules to accommodate new/added or deleted services.

Each module provides for establishment of a secure connection 218A-C between the external entity 214 and the enterprise 216 for the purpose of transferring data to and from the external entity 214 and the enterprise 216. The secure connection 218A-C is established by the data transfer application 208, and, thus does not require the external entity to configure a secure connection on their own (i.e., utilize Information Technology (IT) resources that may not be available to the external entity). Further, since the connection that is established is secure (i.e., a tunnel connection or the like) the external entity is not required to perform additional security functions (beyond logging into the application) when transferring data (e.g., no need to enter credentials, provide answers to out-of-pocket questions or the like). As such once the external entity 214 has the data transfer application 208 loaded and executing, the external entity can immediately begin transferring data through the secure connection 218A-C using the simplified and efficient approach of the data transfer application 208.

The data that is transferred via the secure transfer application 208 may be in any known or future known file format and, therefore, does not require the eternal entity to configure a format specific data transfer transaction. An external entity would typically implement various different software applications to transfer data, each application being specific to the type/format of data being sent or the like. Since the present invention allows for data transfer in any file format, the data transfer obviates the need for the external entity to implement and support various different data transfer applications.

In addition, the data transfer application 208 is configured to support any known and, in some embodiments, future known, file transfer protocols. In this regard, the data transfer application 208 is deemed to be protocol-agnostic. Moreover, the data that is transferred by the external entity may be data stored locally, on the device 102A, 102B, 103C accessing the data transfer application 208 or at a networked local server (not shown in FIG. 1) or the like. In addition the data that is transferred may be stored at a cloud service 106, a cloud connection service (not shown in FIG. 1) an external network server (e.g., Internet-based or the like) (not shown in FIG. 1) or the like. In this regard, the external entity 214 may retrieve the data from the cloud service 106 via wireless connection 107 and transfer the data via secure connection 218. In additional embodiments of the invention, the data transfer application 208 may be configured to establish a secure connection 218D between the cloud service 106 or a cloud connection service and the enterprise 216, in such embodiments the external entity 214 may direct the cloud service 106 or the cloud connection service to transfer specified data files stored in the cloud directly to the external entity via secure connection 218D.

In addition, system 216 includes hub device 108, which may comprise a server or a server with router capabilities, which is controlled by enterprise 216 and includes data transfer management application 110. While FIG. 1 illustrates a single device, in practice, the hub may comprise multiple devices and/or while FIG. 1 illustrates a single hub, in practice, multiple hub devices may be implemented by the enterprise 216 to accommodate multiple external entities and/or various different data transfer management functions.

In specific embodiments of the system 100, data transfer management application 110 is configured to receive data transfer from the external entities 214 via secure connection 218, determine enterprise routing for the data being transferred (i.e., a storage location or the like). In specific embodiments, the routing will be determined based on which module/secure connection was used to transmit the data and an external entity-identifier (e.g., customer account number) associated with the secure connection and/or module. For example. In those embodiments in which the enterprise is a financial institution and the external entity is a commercial customer, the data transfer management application 110 may determine routing for the data being transmitted based on the module/secure connection that is transmitted the data (e.g., ACH) and the customer account number associated with the module. In further embodiments of the system, data transfer management application 110 is configured to receive data from the enterprise 216 that is to be transmitted to one or more external entities 214 and determine which of the entities the data should be transferred to and a corresponding secure connection to use for the data transfer.

In further specific embodiments of the system 100, the data transfer management application 110 is configured to self-manage the deployed data transfer applications 208. Self-managing of the data transfer applications 208 means that the external entity does not have responsibility for performing certain actions required to manage the data transfer application 208 (i.e., certain actions occur automatically without requiring any action/intervention on the part of the external entity user). In this regard, in specific embodiments of the invention, the data transfer management application 110 is configured to push/deploy any updates to the modules and/or the data transfer application 208 and/or updates/changes to the service data or external entity data included in a service profile or an external entity profile (e.g., changes to account numbers, additional account numbers or the like). Updates/revisions to the modules/applications may include updates/revisions that ensure that the modules/applications are compliant with enterprise and/or industry regulations (i.e., self-regulation of the data transfer applications 214). In addition, in other specific embodiments of the invention, the data transfer management application 110 is configured to automatically push/deploy any new modules to the external entity in response to the external entity acquiring or otherwise adding a new service provided by the enterprise 216.

In still further specific embodiments of the system 100, the data transfer management application 110 is configured to self-manage the deployed date transfer applications 208 by managing the security level at the module level and/or the data level. The security level defines the amount of security associated with the data transfer (e.g., types of encryption that may be required, transfer protocols that may be used, signage required and the like). The data transfer management application 110 may be configured to dynamically change the security level based on the risk associated with the data (i.e., how important the data is) and/or current known vulnerabilities that may exist.

Moreover, in further embodiments of the system 100, data transfer management application 110 is configured to track the status/progress of the data transfer within the enterprise 216, such that status/tracking information can be communicated back to the data transfer application and provided to the external entity user in real-time or near-real-time.

Referring to FIG. 2, a block diagram is presented of an apparatus 200 configured for transferring data between an enterprise and an external entity, in accordance with embodiments of the present invention. The apparatus includes a computing platform 202 having a memory 204 and at least one processor 206 in communication with the memory. The apparatus 200 which may include more than one physical device or unit is operable to receive and execute modules, routines and applications, such as data transfer application 208 and the like.

The data transfer application 208 includes one or more modules that are configured for protocol-agnostic and technology-agnostic data transfer between an enterprise 216 and an external entity 214. The quantity and type of modules 210 will vary from external entity-to-external entity based on the type of services 212 that the enterprise 216 provides to the external entity 214. Moreover, each module 210 is configured to provide data transfer between the enterprise 216 and the external entity 214 via one or more secure connections 218 (i.e., a tunnel connection or the like). In specific embodiments, each service has a corresponding secure connection 218. As previously noted, launching/executing the data transfer application 208 results in establishment of the secure connections 218 for each module 210 and/or service 212. As such the external entity 214 does have to create data transfer transactions using other data-specific and or transfer-specific file transfer applications.

Additionally, data transfer application 208 includes user interface 220, such as a Graphical User Interface (GUI) and/or command line that is configured to receive user input/selection 222 that selects a module 210 and one or more data files 224 for dynamically transferring the selected data files from the external entity (or associated storage location, such as a cloud, web-based storage or the like) to the enterprise. In specific embodiments the user interface 220, such as a GUI, provides a first display of the modules 210 currently implemented in the data transfer application 208 and, upon user selection of a module, the data files associated with the module or a tree-like hierarchy of the enterprises' network storage locations for the user to locate a data file associated with a storage location. Upon user selection of a data file 224 and, in some embodiments, the secure connection 218 is established or invoked and the data file 224 automatically transfer to the enterprise 216 without requiring the user to build a data file transaction and/or provide security credentials or the like (i.e., a simplified "point, click and send" approach to data file transfer). In other embodiments in which the user interface 220 is or includes a command line, a user may enter a predetermined script that corresponds to a file and/or file location that is desired to be communicated to the enterprise 216. Moreover, the user interface 220 allows a user to dynamically stop/cancel a data transfer that is currently occurring.

Additionally, user interface 220 is configured to receive user selection/input 226 that selects a module 210 and pre-configure scheduled transfers 228 of one or more selected data files 224. The user may pre-configure a scheduled transfer 228 to occur at a predetermined date and time in the future or transfers to occur on an ongoing basis, e.g., every business day at 5 pm or every Monday at 9 am. Additionally, the user may pre-configure a scheduled transfer to coincide with creation of the file; such that once the file is generated it is immediately transferred via the secure connection 218 to the enterprise 216. Moreover, the user interface 220 is configured to receive user inputs that start, stop, modify and/or reschedule a previously scheduled transfer. As such a user can remotely access the data transfer application 208, such as via a mobile device, and modify, cancel or reschedule a pending data transfer.

Referring to FIG. 3 a more detailed block diagram is presented of the apparatus 200, which is configured for transferring data between an enterprise and an external entity, in accordance with embodiments of the present invention. In addition to providing greater detail, FIG. 3 highlights various alternate embodiments of the invention. The apparatus 200 may include one or more of any type of computing device. The present apparatus and methods can accordingly be performed on any form (PC, laptop, mobile communication device or the like) of one or more computing devices.

The apparatus 200 includes computing platform 202 that can receive and execute algorithms, such as routines, and applications. Computing platform 202 includes memory 204, which may comprise volatile and non-volatile memory, such as read-only and/or random-access memory (RAM and ROM), EPROM, EEPROM, flash cards, or any memory common to computer platforms. Further, memory 204 may include one or more flash memory cells, or may be any secondary or tertiary storage device, such as magnetic media, optical media, tape, or soft or hard disk. Moreover, memory 204 may comprise cloud storage, such as provided by a cloud storage service and/or a cloud connection service.

Further, computing platform 202 also includes processor 206, which may be an application-specific integrated circuit ("ASIC"), or other chipset, processor, logic circuit, or other data processing device. Processor 206 or other processor such as ASIC may execute an application programming interface ("API") (not shown in FIG. 3) that interfaces with any resident programs, such as data transfer application 208 and routines, sub-modules associated therewith or the like stored in the memory 204 of the apparatus 200.

Processor 206 includes various processing subsystems (not shown in FIG. 3) embodied in hardware, firmware, software, and combinations thereof, that enable the functionality of apparatus 200 and the operability of the apparatus on a network. For example, processing subsystems allow for initiating and maintaining communications and exchanging data with other networked devices. For the disclosed aspects, processing subsystems of processor 206 may include any subsystem used in conjunction with data transfer application 208 and related algorithms, sub-algorithms, modules, sub-modules thereof.

Computer platform 202 may additionally include communications module (not shown in FIG. 3) embodied in hardware, firmware, software, and combinations thereof, that enables communications among the various components of the apparatus 200, as well as between the other networked devices. Thus, communication module may include the requisite hardware, firmware, software and/or combinations thereof for establishing and maintaining a network communication connection.

As previously discussed in relation to FIG. 2, the memory 204 of apparatus 200 stores data transfer application 208. Data transfer application 208 includes one or more external-entity specific modules 210 that are configured for protocol-agnostic and technology-agnostic (any operating system or any computing device) transfer of data between an enterprise and an external entity. In specific embodiments, the enterprise is a financial institution and the external entities are third parties, such as commercial banking customers. Retail banking customers, vendors or the like. The data transfer application 208 is provided by the enterprise to the external entity (e.g., tangible storage device or activatable link for download) and is configured to include the modules associated with the services that being provided to (or are otherwise associated with) the external entity 214. The modules 210 provide for the transfer of data via a secure connection 218 between the external entity 214 and the enterprise 216. In specific embodiments of the apparatus, the modules 210 and/or the services 212 within the module are associated with one or more external entity identifiers (such as an account number or the like), which automatically attach to data file(s) 232 being transferred from the external entity 214 to the enterprise 216 to ensure that, upon receipt by the enterprise 216, the data file is automatically routed to storage location associated with the external entity identifier (e.g., routed to the account associated with the account number or the like).

In specific embodiments of the apparatus 200, the data transfer application 208 is configured to be self-updating to allow the enterprise to, without requiring any external entity user intervention, implement revisions/updates 234 to the modules 210 and/or the overall application 208. In this regard, the enterprise deploys/pushes the updates to the application 208 and the application automatically downloads and executes the updates to revise the modules 210 and/or application 208. The external entity may receive an alert or some other form of communication indicating that the update has occurred. In other embodiments of the apparatus, the data transfer application 208 is configured to be self-updating to allow the enterprise to, without requiring any external entity user intervention, implement changes/updates 236 to external entity data (i.e., changes to external entity profile data, e.g., account number changes) and/or service data. In this regard, the enterprise deploys/pushes the changes to the application 208 and the application automatically changes the profile data. The external entity may receive an alert or some other form of communication indicating that the update has occurred.

Moreover, in other specific embodiments of the apparatus 200, the data transfer application 208 is configured to be self-updating to allow the enterprise to, without requiring external entity user intervention, provision new modules 238 to the application 208 in response to the external entity 214 adding associated new services. In this regard, the enterprise deploys/pushes the new modules to the application 208 and the application automatically receives the new modules 210. In addition, according to specific embodiments of the apparatus 200, the data transfer application 208 is configured to be self-regulating 240 to allow the enterprise to, without external entity user intervention, regulate the modules 210 and/or app 208 to reflect changes in current enterprise or industry regulations/standards.

In additional embodiments of the apparatus 200, the data transfer application 208 is further configured to self-manage a security level 242 provided to each module or the overall application. Self-managing of the security level provides for the enterprise to configure, and in some instances dynamically change, without external entity user intervention, the security level provide to the application 208 or modules 210 based on at least one of (1) the risk 244 associated with the specific data being transferred, and (2) current data transfer vulnerabilities 246 identified by the enterprise. Security levels may be configured by the enterprise and may dictate encryption methods, date/time of data transfer, protocols and the like. In this regard, if the data is deemed to be highly confidential and/or proprietary the enterprise may increase the security level afforded to the module that is transferring the data. The increase in the security level may be permanent, for a temporary time period or for a one-time data transfer.

Moreover, according to specific embodiments of the apparatus 200, the data transfer application 208 is further configured to ensure encryption compliance 248 with exportable encryption rules. Certain geographic locations, such as countries or the like, have rules in place that define which encryption ciphers are acceptable. In this regard, the data transfer application 208, in conjunction with the data transfer management application (112 of FIG. 1) is configured to determine the geographic location (e.g., country) from which data will be transferred and comply with the encryption rules associated with that geographic location (i.e., encrypt the data with an encryption cipher that meets the country's exportable encryption rules).

In additional embodiments of the apparatus 200, the data transfer application 208 is configured with a one-click capability to (1) generate encryption keys 250, as well as, (2) upload newly generated public keys to the enterprise, and (3) download the enterprise's key. This simplified approach makes it possible for the user to easily generate multiple keys if the data transfer requires such. In addition, the application 208 is configured to store the keys in an encryption database that is only accessible within the data transfer application 208.

In other related embodiments of the apparatus, the data transfer application 208 is configured to provide the user the capability to either have documents auto-signed (for the purpose of verifying the documents and/or sender) by the application 208 or independently signed by another application/program 252. Moreover, the data transfer application 208 may be configured to support other authentication and integrity mechanisms, such as fingerprints, checksums (SHA2, SHA3) and the like. Such other authentication and integrity verifications may be implemented along with or in lieu of encryption for data transfer of less secure data, such as public information or the like.

Additionally, embodiments of the apparatus 200 provide for the data transfer application 208 to be configured with a data throttling mechanism 254 that determines if the file size of the file being transmitted exceeds a pre-configured file size limit and, if so, segments the file into two or more segments, which are then transmitted separately and in spaced apart increments so as to affect throttled data exchange. The throttled data exchange ensures that the file is successfully transmitted. In addition, in the event that one or more segments are not successfully transferred, the data throttling mechanism 254 is configured such that only the segments that were not received need to be re-transferred/re-transmitted. In related embodiments of the invention, the data transfer application is configured for a user to pre-configure alert notifications 256 (emails, text messages or the like) that are communicated to designate individuals or groups of individuals as a result of an occurrence of a pre-configured event (e.g., data transfer failure or the like).

Moreover, the data transfer application 208 may be configured to allow a user to recall a completed data transfer and/or mark a completed data transfer as being "in error" or "invalid". Such marking of previously completed data transfers is made possible because each data transfer has a corresponding tag that allows for subsequent signals to be communicated that mark a tagged item as "invalid" or the like.

In addition, in accordance with specific embodiments of the invention, the data transfer application 208 is configured to allow for a previous data transfer to be referenced in a subsequent data transfer. Such referencing is accomplished by including the tag associated with the previous data transfer in the subsequent data transfer. Such referencing of a previous data transfer in a subsequent data transfer allows for full or partial replacement of files and/or data within files to occur. For example, a subsequent file transfer may include new file reference tags associated with specific line entries in the previously transferred file, which serve to replace the line items in the previously transferred file with the items in the currently transferred file. In lieu of or in addition to the use of reference tags, logic may be embedded in a subsequently transferred file that serves to replace one or more line items in a previously transferred file. The use of reference tags and/or embedded logic reduces overhead and processing times that would otherwise be required if the entire previously transferred file were required to be re-transferred.

In additional embodiments of the apparatus 200, the data transfer application 208 is configured to provide quick connections 258 and/or quick connection profiles, which act as temporary profiles for the purpose of one-time only data transfers and the like. Quick connections and quick connection profiles serve as a temporary account, which are removed from the memory or disabled upon completion of the transfer and provide a streamlined and secure approach to one-time only data transfers.

Further embodiments of the apparatus 208 are configured such that the data transfer application 208 is configured to provide a user interface 260 that tracks the status of the data transfer 262 as the transfer occurs (i.e., dynamic tracking within a transaction progress dashboard). Tracking the status of transfer may include indicating the routing status/location of the data within the enterprise, as well as, a percentage completion of the data transfer at one or more storage locations within the enterprise. In addition, the data transfer application 208 may be configured to generate and attach a tracking code to the file prior to transfer that is subsequently returned to the data transfer application upon completion of the transfer and, thus, serves to indicate to the external entity that the data transfer has successfully completed.

Additionally, as discussed in relation to FIG. 2, data transfer application 208 includes user interface 220, such as a Graphical User Interface (GUI) and/or command line that is configured to receive user input/selection 222 that selects a module 210 and one or more data files 224 for dynamically transferring the selected data files from the external entity (or associated storage location, such as a cloud, web-based storage or the like) to the enterprise. In specific embodiments the user interface 220, such as a GUI, provides a first display of the modules 210 currently implemented in the data transfer application 208 and, upon user selection of a module, the data files associated with the module or a tree-like hierarchy of the enterprises' network storage locations for the user to locate a data file associated with a storage location. Upon user selection of a data file 224 and, in some embodiments, the secure connection 218 is established or invoked and the data file 224 is automatically transferred to the enterprise 216 without requiring the user to build a data file transaction and/or provide security credentials or the like (i.e., a simplified "point, click and send" approach to data file transfer). In other embodiment in which the user interface 220 is or includes a command line, a user may enter a predetermined script that corresponds to a file and/or file location that is desired to be communicated to the enterprise 216.

Additionally, user interface 220 is configured to receive user selection/input 226 that selects a module 210 and pre-configure scheduled transfers 228 of one or more selected data files 224. The user may pre-configure a scheduled transfer 228 to occur at a predetermined date and time in the future or transfers to occurring on an ongoing basis, e.g., every business day at 5 pm or every Monday at 9 am. Additionally, the user may pre-configure a scheduled transfer to coincide with creation of the file; such that once the file is generated it is immediately transferred via the secure connection 218 to the enterprise 216.

Additionally, according to specific embodiments of the system/apparatus, the data transfer application 208 is configured to allow for other third party applications/modules to plug-in or otherwise seamlessly integrate with the data transfer application for the purpose of managing data transfer between the external entity and other entities other than the application providing enterprise (e.g., other enterprises or the like).

Thus, systems, apparatus, methods, and computer program products described above provide for a technology-agnostic and protocol-agnostic means for transferring data between an enterprise, such as a financial institution or the like and external entities, such as commercial banking customers and the like. The embodiments provide the user with a data transfer solution that is compatible with all major operating systems, supports mobile platforms and allows for local data transfer, as well as, data transfer from cloud services and cloud connection services. Moreover, the comprehensive nature of the application provides for applicable data transfer amongst all of the different services provided by the enterprise and provides the user/external entity with a streamlined means for transferring data to and from the enterprise. In this regard, embodiments of the invention allow for the external entity to immediately transfer data upon inception of the relationship with the enterprise and/or upon acquisition of a new service provided by the enterprise without having to establish a secure connection that is specific to the service or an application. Moreover, the application minimizes external entity involvement from an Information Technology (IT) standpoint, such that any user can efficiently, effectively and reliably transfer data to and from an enterprise with minimal risk and high confidence.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for transferring data between an enterprise and an external entity, the apparatus comprising: an external entity-side computing platform having a memory and at least one processor in communication with the memory; and a data transfer application stored in the memory, executable by the processor and including: a plurality of external-entity specific modules configured for protocol-agnostic and technology-agnostic transfer of data between the external entity and enterprise, wherein each of the plurality of modules (i) are specific to a service provided to the external entity by the enterprise, (ii) provide for the transfer of data via a secure connection between the external entity and the service, (iii) are associated with at least one external entity identifier that automatically attaches to a data file being transferred, wherein the data file, upon receipt by the enterprise is automatically routed to a storage location based on the service associated with module and the external entity identifier, and (iv) provide for the enterprise to configure and dynamically change, without intervention by the external entity, the security level based on one or more of (1) risk associated with data being transferred or (2) current data transfer vulnerabilities identified by the enterprise, wherein the security level defines at least one of encryption method, timing of data transfer and transfer protocol, and a first user-interface configured to provide for the external entity to select a module for (1) dynamic transferring of one or more data files from the external entity to the enterprise, and (2) pre-configuring scheduled transfers of one or more data files.

2. The apparatus of claim 1, wherein the enterprise is defined as a financial institution and the external entity is one of a commercial customer, a consumer customer or a vendor.

3. The apparatus of claim 1, wherein the data transfer application is self-updating to provide for the enterprise to, without external entity intervention, (1) implement revisions to the plurality of modules, (2) make changes to external entity data associated with a module and (3) provide new modules to the data transfer application in response to the external entity adding associated new services.

4. The apparatus of claim 1, wherein the data transfer application is self-regulating to provide for the enterprise to, without external entity intervention, ensure that the application is compliant with enterprise regulations.

5. The apparatus of claim 1, wherein the data transfer application further includes a second user-interface configured to provide for a user to track a status of the transfer of data.

6. The apparatus of claim 1, wherein the plurality of external-entity specific modules are further configured for protocol-agnostic and technology-agnostic transfer of data from the external entity to the enterprise, wherein the data that is transferred may be data stored locally at the external entity or data accessible to the external entity via cloud storage.

7. The apparatus of claim 1, wherein the plurality of external-entity specific modules are further configured to provide for the transfer of data via a secure connection between the external entity and a middleware component of the service.

8. The apparatus of claim 1, wherein the first user-interface is further configured to provide for the external entity to select a module for pre-configuring scheduled transfers of one or more data files, wherein pre-configured scheduled transfers may be configured to provide for data files to be automatically transferred upon creation of the data file or at predetermined times.

9. The apparatus of claim 1, where the data transfer application is further configured to provide for temporary secure connection channels and temporary connection profiles that are configured to provide for one-time transfer of data between the enterprise and external entity and are removed from the memory or disabled upon completion of the one-time transfer.

10. The apparatus of claim 1, wherein the data transfer application is further configured to provide for throttled transfer of data, wherein a data file is segmented and communicated in individual segments.

11. The apparatus of claim 1, wherein the data transfer application is further configured to recognize a geographic location from which a data file is transferred and comply with encryption rules associated with the geographic location.

12. A system for transferring data between an enterprise and external entity, the system comprising: a computing device accessible to the external entity, in communication with a first memory and including at least one first processor; a data transfer application stored in the first memory, executable by the first processor and including a plurality of external-entity specific modules configured for protocol-agnostic and technology-agnostic transfer of data between the external entity and enterprise, wherein each of the plurality of modules (i) are specific to a service provided to the external entity by the enterprise, (ii) provide for the transfer of data via a secure connection between the external entity and the service, (iii) are associated with at least one external entity identifier that automatically attaches to data being transferred, and (iv) provide for the enterprise to configure and dynamically change, without intervention by the external entity, the security level based on one or more of (1) risk associated with data being transferred or (2) current data transfer vulnerabilities identified by the enterprise, wherein the security level defines at least one of encryption method, timing of data transfer and transfer protocol; a hub computing device under control of the enterprise, in communication with a second memory and including at least one second processor; and a data transfer management application stored in the second memory, executable by the second processor and configured for receiving the transfer of data via the secure connections and determining automatic enterprise routing and storage location for the data based on the service associated with the module and the external entity identifier associated with the data being transferred.

13. The system of claim 12, wherein the data transfer application is further configured for providing a user-interface that is configured to provide the external entity to select a module for (1) dynamic transferring of one or more data files from the external entity to the enterprise, or (2) pre-configuring scheduled transfers of one or more data files.

14. The system of claim 12, wherein the data transfer management application is further configured to communicate to the data transfer application (1) revisions to the plurality of modules, (2) updates to external entity data or service data associated with a module, (3) new modules in response to the external entity adding services and wherein the data transfer application is further configured to receive (1) the revisions, (2) the updates and (3) the new modules without external entity user intervention.

15. An apparatus for transferring data between a financial institution and third-party associated with the financial institution, the apparatus comprising: a computing platform under control of and accessible to the third-party, in communication with a memory and including at least one processor in communication with the memory; and a data transfer application stored in the memory, executable by the processor and including: a plurality of third-party specific modules configured for protocol-agnostic and technology-agnostic transfer of data between the third-party and the financial institution, wherein each of the plurality of modules (1) are specific to a service provided to the third-party by the financial institution, (2) provide for the transfer of data via a secure connection between the third-party and the service, and (3) are associated with one or more third-party identifiers that automatically attach to a data file being transferred, wherein the data file, upon receipt by the financial institution is automatically routed to a storage location associated with the third-party identifier and the service associated with the module, and (4) provide for the enterprise to configure and dynamically change, without intervention by the external entity, the security level based on one or more of (i) risk associated with data being transferred or (ii) current data transfer vulnerabilities identified by the enterprise, wherein the security level defines at least one of encryption method, timing of data transfer and transfer protocol, and a user-interface configured to provide the third-party selection of a module for (1) dynamic transferring of one or more data files from the third-party to the financial institution, and (2) pre-configuring scheduled transfers of one or more data files.

16. The apparatus of claim 15, wherein the data transfer application is self-updating to provide for the financial institution to, without third-party user intervention, (1) implement revisions to the plurality of modules, (2) make changes to third-party data associated with a module and (3) provide new modules to the data transfer application in response to the third-party adding associated new services.

* * * * *